(12) United States Patent
Hunter et al.

(10) Patent No.: US 7,833,005 B2
(45) Date of Patent: Nov. 16, 2010

(54) CLOSED-LOOP SYSTEM AND A METHOD FOR SEPARATING MATERIALS OF DIFFERING MELTING POINTS

(75) Inventors: Shawn D Hunter, Corvallis, OR (US); Isaac Farr, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1547 days.

(21) Appl. No.: 10/637,271

(22) Filed: Aug. 8, 2003

(65) Prior Publication Data

US 2005/0033478 A1 Feb. 10, 2005

(51) Int. Cl.
*B28B 11/22* (2006.01)

(52) U.S. Cl. .................. 425/445; 425/404; 425/375; 425/446

(58) Field of Classification Search ............. 425/174.4, 425/215, 445, 446, 375, 404; 264/308
See application file for complete search history.

(56) References Cited

U.S. PATENT DOCUMENTS

| 5,143,663 | A | * | 9/1992 | Leyden et al. ............... 264/401 |
| 5,824,250 | A | * | 10/1998 | Whalen et al. .............. 264/219 |
| 5,900,207 | A | | 5/1999 | Danforth et al. |
| 6,030,199 | A | | 2/2000 | Tseng |
| 6,066,264 | A | * | 5/2000 | Ronan et al. ................. 210/776 |
| 6,660,208 | B2 | * | 12/2003 | Hanna ........................ 264/401 |

* cited by examiner

*Primary Examiner*—Maria Veronica D Ewald

(57) ABSTRACT

A closed loop system for separating materials of differing melting points includes an ultrasonic bath including a solution configured to supply thermal energy and cavitation to the materials of differing melting points, a solution reservoir configured to adjust levels of the solution in the ultrasonic bath, and a filter configured to remove particles of one of the materials of differing melting points from the solution.

18 Claims, 10 Drawing Sheets

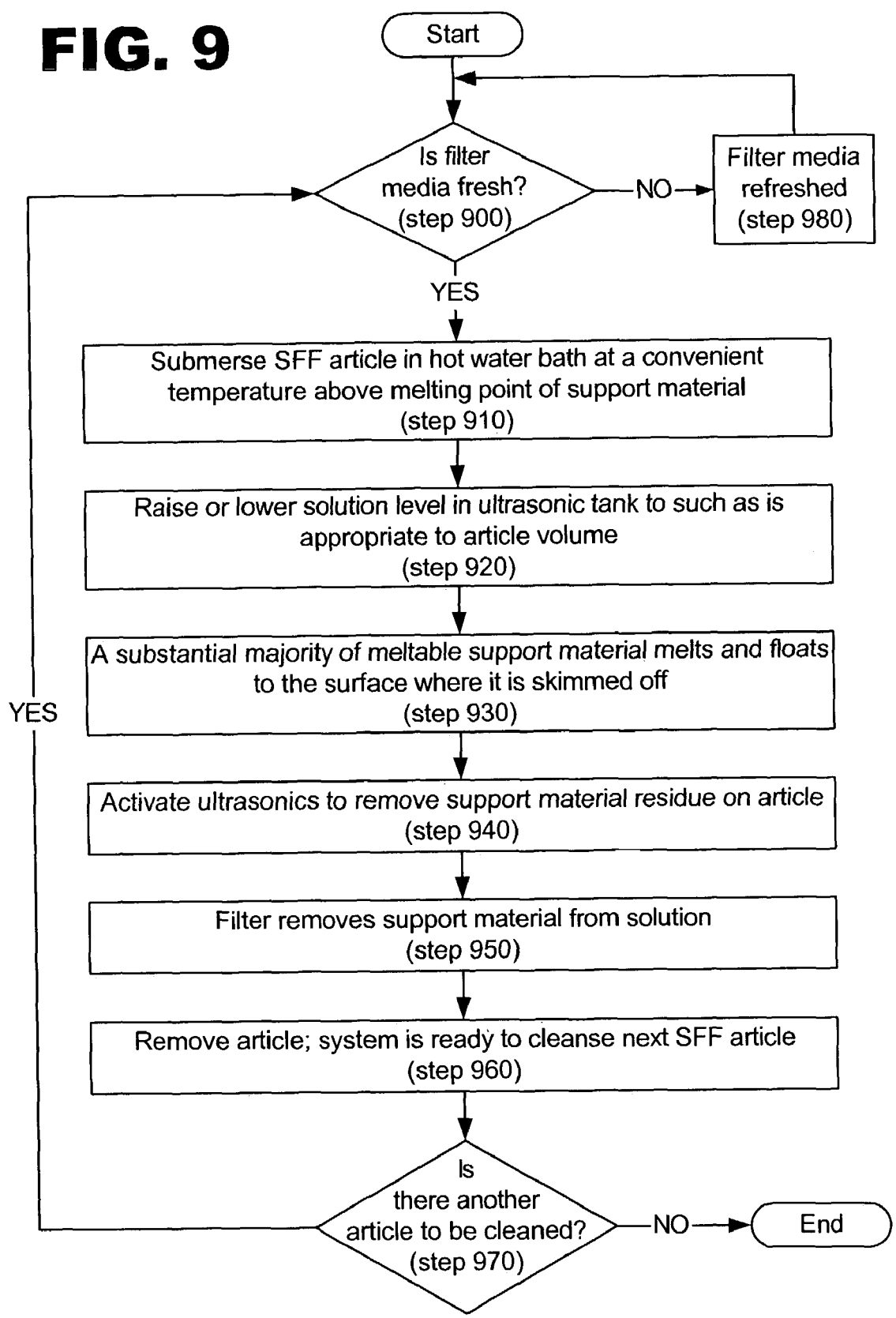

CLOSED-LOOP SYSTEM AND A METHOD FOR SEPARATING MATERIALS OF DIFFERING MELTING POINTS

BACKGROUND

Solid freeform fabrication (SFF) is a process whereby three-dimensional objects, for example, prototype parts, models, working tools, production parts, molds, and other articles are manufactured. Computer aided design (CAD) is commonly used to automate the design process. Using a suitable computer, an operator may design a three-dimensional article and then create that object by the use of a positionable ejection head that selectively emits small mass particles. Many methods have been developed to manufacture SFF objects according to the above principles including stereolithography, selective laser sintering, and powder based three-dimensional printing technologies. The above-mentioned techniques typically include support structures designed to join the SFF object to a system platform and attach any overhangs, large spans, or disjoint areas. The addition of these structures to the CAD model and subsequent manual removal from the SFF article during cleaning is labor intensive and often requires special skills, significantly increasing the cost of fabrication.

One traditional method for forming three-dimensional objects includes a device having two positionable jetting heads with two feeder lines connected to remote sources of material such as melted wax to provide both object and support material. This method and apparatus are able to construct an object from a coordinate representation without regard to the angular dimensions thereof by automatically depositing support material wherever needed to support the build material. In this way, the user need not add support structures to the CAD model; software automatically adds support material wherever needed. One common method uses different waxes having varying melting temperatures for the build and support materials, with the support wax having a lower melting point than the build wax. While this traditional method allows the undesirable support material to be melted away, traditional processes used to clean such SFF articles with phase change support are time consuming, may utilize a hydrocarbon or other organic solvent (which may be noxious), are manual (requiring skilled labor), tedious, and expensive. Traditional cleaning processes may also leave an undesirable waxy support material residue on the surface of the SFF object.

SUMMARY

A closed loop system for separating materials of differing melting points includes an ultrasonic bath including a solution configured to supply thermal energy and cavitation to the materials of differing melting points, a solution reservoir configured to adjust levels of the solution in the ultrasonic bath, and a filter configured to remove particles of one of the materials of differing melting points from the solution.

BRIEF DESCRIPTION OF THE DRAWINGS

The accompanying drawings illustrate various embodiments of the present invention and are a part of the specification. The illustrated embodiments are merely examples of the present invention and do not limit the scope of the invention. The summary and other features and aspects of the present invention will become further apparent upon reading the following detailed description and upon reference to the drawings in which:

FIG. 9 is a flowchart illustrating a method of operating the system illustrated in FIG. 3 according to one exemplary embodiment.

Throughout the drawings, identical reference numbers designate similar, but not necessarily identical, elements.

DETAILED DESCRIPTION

The present specification describes a system and method for automating the removal of meltable support material from build articles in an office friendly environment. More specifically, the present method includes melting a substantial majority of support material, removing additional support material with ultrasonics in a hot bath, and filtering support material from the hot bath to prolong the effective life of the hot bath.

As used in this specification and in the appended claims, the term "meltable" is meant to be understood broadly as describing any support material having a lower melting point than a solid freeform fabrication build material. An "emulsion" is meant to be understood as any uniform mixture of two normally immiscible liquids. A "skimmer" is meant to be understood as any device or method that may be used to remove melted support material from an emulsion or from the surface of a solution, and may include, but is in no way limited to, a belt, a disk, a drum, a mop, a tube, a floating suction, a columnar, a co-current, a counter current, a venturi technology skimmer, or any combination of these or other skimmer technologies. Moreover, a manual technique for removing melted support material may also constitute a skimmer for the purposes of this disclosure. The terms "ultrasonic cleaning" and "ultrasonic scrubbing" are used to denote a method of removing surface residues from objects by means of small bubbles (cavitation bubbles) produced by high frequency waves. The bubbles' sequential formation and subsequent violent collapse (cavitation) may remove contaminants from an object's surface. "Ultrasonics" is meant to be understood as any transducer or device used to induce cavitation in a fluid. Additionally, the term adsorb is used to denote a process whereby a particle or molecule adheres to the surface of a filtering media such as, but in no way limited to, oil adsorbent granules, sand filter granules, and/or activated carbon.

Figure 1:
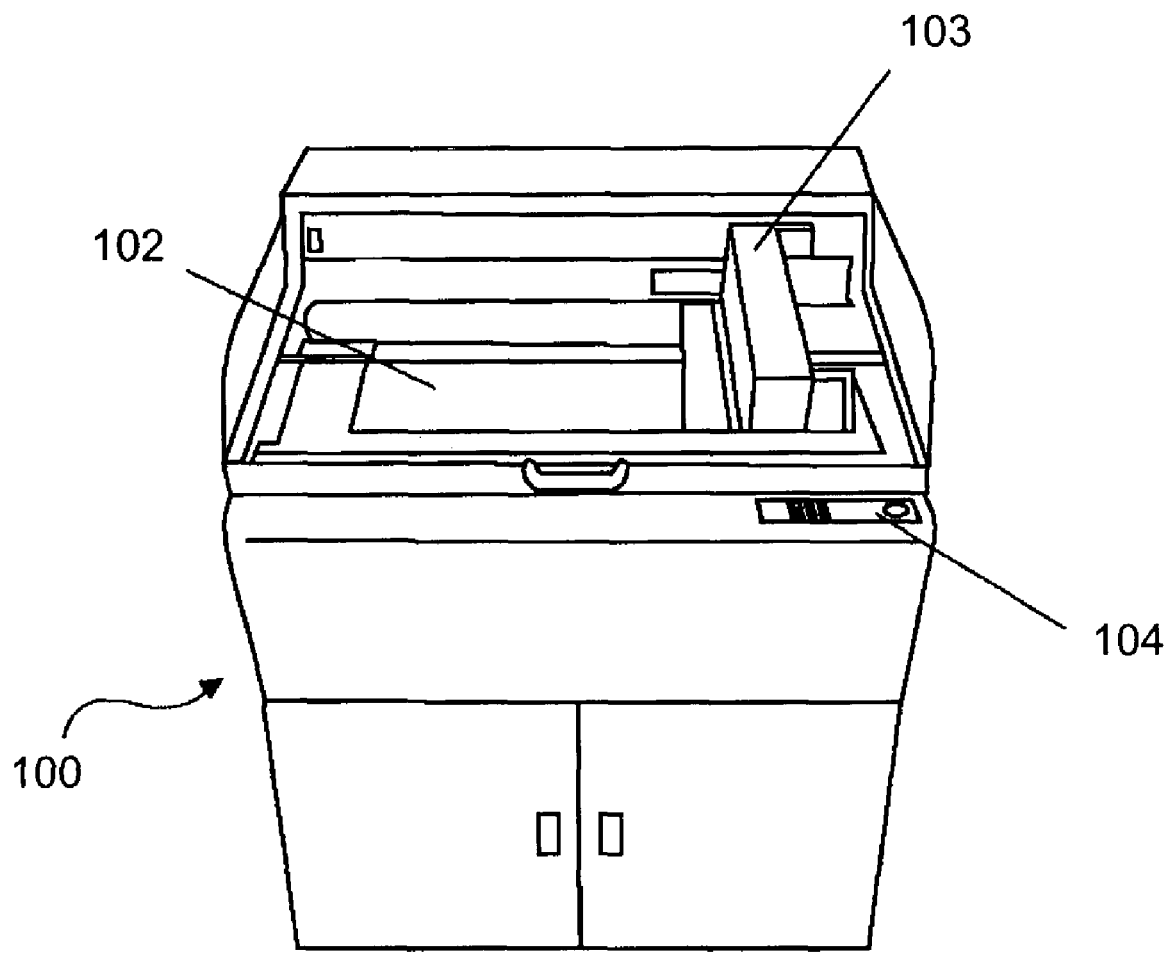
FIG. 1 is a perspective view of a solid freeform fabrication (SFF) system that may incorporate the present system and method according to one exemplary embodiment.

Referring now to the figures and in particular to FIG. 1, a solid freeform fabrication (SFF) system (100) configured to incorporate particle deposition technology is illustrated. The SFF system (100) shown in FIG. 1 may be configured to incorporate the present cleaning system and method. While the present system and method are explained in the context of cleaning a wax based object produced in an SFF system (100), a polymer jetting system or any other similarly operated system may be substituted in place of the SFF system (100) and may be used in conjunction with the present cleaning system.

In the SFF system (100) illustrated in FIG. 1, both build and support materials may be deposited upon a fabrication stage (102) to form individual layers of a desired object. A moving carriage (103) may position the jetting heads, which may in turn deposit build and/or support materials. A user interface or control panel (104) may also be provided in order to allow the operator to control and monitor the fabrication process.

Figure 2:
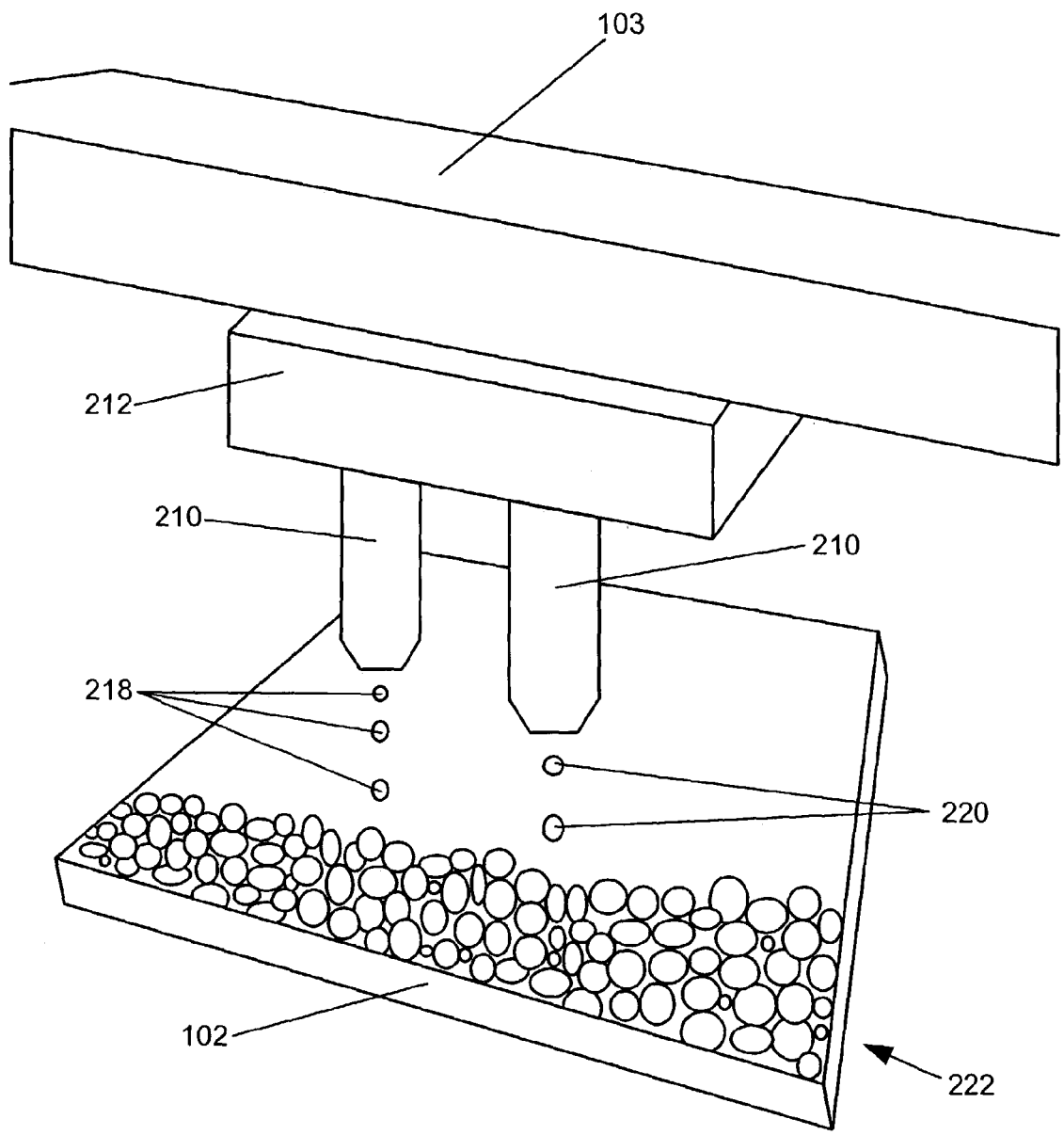
FIG. 2 is a perspective view of an SFF system fabricating an SFF article according to one exemplary embodiment.

FIG. 2 is a perspective representation of the moving carriage (103), certain undercarriage components, and the fabrication stage (102) in operation. Operation of the SFF system (100; FIG. 1) may incorporate two jetting heads (210): one supplied with build material to form the fabricating particles, and at least one other head supplied with material that may form the support particles. Numerous alternatives to this scheme are also possible. For example, a single jetting head incorporating two feeder lines may be used. In an alternative configuration, a first linear array of fabricating particle jets and a second linear array of support particle jets may be employed. Any number of materials may be used in conjunction with this SFF build system; these may include, but are in no way limited to, waxes, plastics, metals, ceramics, UV curable materials, and combinations thereof. Alternatively, a binder material may be deposited by a jetting head or heads onto a bed of reactive powder, thereby forming a build material surrounded by a meltable unbound-powder support material. While the present system and method may be used to clean many possible build materials, so long as the support material has a melting point below the boiling point of a solution, for the purpose of illustration and ease of explanation only, the present system and method will be described in the context of an SFF system (100; FIG. 1) incorporating a two jet system as shown in FIG. 2 and using two waxes with different melting points as build and support materials, respectively.

The jetting head or heads (210) illustrated in FIG. 2 may be coupled by means of suitable electronic and mechanical linkages to one or more servo mechanisms (212), which are responsive to commands issued by a controller (not shown). The controller may be configured to translate coordinates representing a layer of a desired 3-dimensional object design (as compiled by a CAD system) into suitable servo commands that position the jetting head or heads (210) above a corresponding position on the fabrication stage (102). The controller may then cause a droplet or droplets (218) of support material to be ejected, which may solidify soon after contact. A complementary set of commands may also be issued by the controller to the jetting head or heads (210), causing it to deposit droplets of build material (220) on positions of the substrate defining the desired three-dimensional object. The build materials may also solidify shortly after deposition. Solidification and curing of the deposited droplets may be due to controlled differences in temperature between the jetting head (210) and the build environment, laser sintering, UV or other high energy beam, chemical binding of a resin to a powder, or other appropriate means. After deposition of an initial layer (222), subsequent layers of material may be similarly formed on top of and in contact with one another forming a desired three-dimensional object.

After a number of layers have been deposited, the structure consisting of fused build particles may be separated from the mass of support particles. The process by which particle separation may be accomplished depends on the choice of material used for each type of particle. According to one exemplary embodiment, the support material may have a lower melting point than that of the build material. By way of example, two different types of wax or polymer may be used for the build and support materials, respectively, the support material having a lower melting point than the build material. While practice of the present cleaning system and method may be accomplished using any two materials having different melting points, variations of the same material having different melting points, or a non-meltable build material surrounded by meltable support material, for ease of explanation only, the following explanation will be made in the context of using build and support materials made of two waxes differing in their respective melting points.

Figure 3:
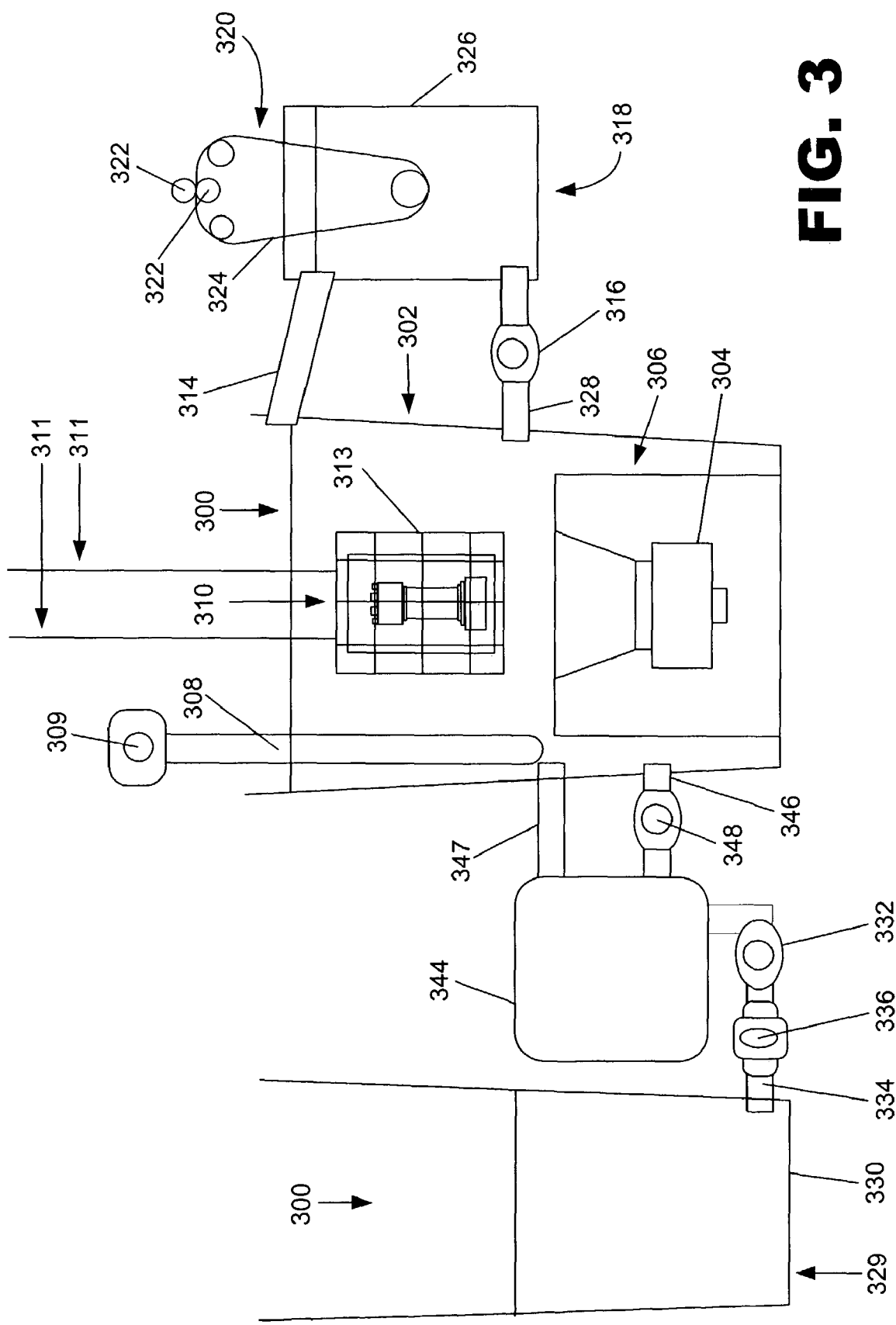
FIG. 3 is a schematic representation of a system for removing support material from previously fabricated SFF articles according to one exemplary embodiment.

Turning now to FIG. 3, an exemplary embodiment of the present cleaning system is schematically illustrated. A solution (300) is shown in an appropriate container, which serves as an ultrasonic tank (302), though the solution (300) may not always be housed in the ultrasonic tank (302). The solution (300) shown in FIG. 3 may or may not be water based. Solvents other than water may also be used effectively in conjunction with ultrasonic tanks and heating elements, though some may require additional design elements not illustrated herein to operate without hazard. While many possible solvents may be used with the following system and method, for ease of explanation only, the following treatment will be described in the context of a hot water solution (300) configured to apply thermal energy to a desired SFF article (310). The combination of the hot water solution (300) and the ultrasonic tank (302) form a hot water bath capable of applying thermal energy to an SFF article (310) sufficient to remove a substantial majority of support material. While the system of FIG. 3 is illustrated with the ultrasonic tank (302) being filled with a hot water solution (300), the ultrasonic tank may not always be filled with solution. Rather, according to another exemplary embodiment, the support material removal process may begin either in a separate dry oven, or in the ultrasonic tank (302) without the hot water solution (300) present at which time the ultrasonic tank may function as a dry oven. The phrase "dry oven" is meant to be understood both here and in the appended claims as any method of introducing thermal energy to an SFF article without submersing it in a hot liquid solution including, but in no way limited to, a resistive element heater or a steam bath.

An ultrasonic transducer (304) may be housed in a watertight enclosure (306) coupled to the ultrasonic tank (302) illustrated in FIG. 3. A resistive element heater (308) or other heating source may also be provided to generate solution temperatures between the melting points of the build and support materials of an SFF article (310). The heater (308) or heating source may be incorporated into the ultrasonic tank (302) itself or it may be physically separate from the ultrasonic tank (302). In an alternative embodiment, the heater (308) may not generate an air and/or solution temperature greater than the melting point of the support material; rather, the heater (308) may merely provide a solution temperature great enough to soften the support material. Heating the support material to a temperature slightly below its melting point may increase the support material's solubility and may soften the support material sufficient to aid in its removal through cavitation or other methods. In either case the heater (308) may be controlled by manual or automatic temperature regulation systems (309). An exemplary SFF article (310), not yet cleaned, including both build and support materials is shown submersed in a wire basket (313) adjacent to the ultrasonic enclosure (306) within the ultrasonic tank (302) in FIG. 3. The wire basket (313) is supported by a number of wires (311). While the article (310) shown in FIG. 3 is a chess piece, any arbitrarily shaped article comprising two or more materials having differing melting temperatures may be amenable to the cleaning process herein described.

According to one exemplary embodiment shown in FIG. 3, the present system may also include a skimmer system (318). The skimmer system (318) may be any device or method used to remove melted support material from a solution and may include, but is in no way limited to, a belt, a disk, a drum, a mop, a tube, a floating suction, a columnar, a co-current, a counter current, a venturi technology skimmer, or any combination of these or other skimmer technologies. While the skimmer device (320) shown in FIG. 3 is illustrated as a belt skimmer system, any device or method configured to remove a support material from a liquid may similarly be incorporated in the present cleaning method. Even a simple system comprising a waterfall-type solution intake at the surface of the hot water bath, passing through an appropriately chosen filter or filter substrate and a pump to return the cleaned water solution to the bath may be a skimmer according to the present system and method. Alternatively, any manual method of removing melted support material may also constitute a "skimmer" as used in the present disclosure. The skimmer system (318), shown in FIG. 3, may include a solution intake (314) serving as an overflow weir near the top of the hot water solution (300), a reservoir tank (326), a belt skimmer device (320) including a belt (324) and pinch rollers (322), and a solution return (328) including a pump (316). When hot water solution (300) rises to the level of the solution intake (314), the hot water solution (300) and buoyant impurities are collected in the reservoir tank (326) where the buoyant impurities in the hot water solution (300) may come into contact with and attach themselves to the belt (324). Once the impurities come into contact with the belt (324), specific gravity and surface tension cause the impurities to attach themselves to the belt. Once on the belt (324), pinch rollers (322) or wiper blades may be used to remove and collect the impurities from the belt (324) thereby cleaning the solution (300). The skimmed solution may then be pumped by the pump (316) to the bath via the solution return (328).

The cleaning system illustrated in FIG. 3 may also include a means of filtering the hot water solution (300) prior to returning it to the ultrasonic tank (302) such as an activated carbon filter (344) or other means for capturing support material present in the hot water solution (300). While the filter (344) shown in FIG. 3 is illustrated as a single activated carbon filter, an oil absorber, a UV energy source, a sand filter, or any other device or method configured to remove emulsified support material or other impurities from the hot water solution (300) may be incorporated in the present cleaning method. Similarly, multiple filter devices or media may be used in combination to increase the efficiency of the filtering process. The activated carbon filter (344) shown in FIG. 3 may include a solution intake (346), a pump (348), and a solution return (347). The pump (348) may draw hot water solution into the filter (344) where activated carbon may adsorb emulsified support material particles. The filtered solution may then be returned to the bath via the solution return duct (347). The activated carbon filter (344) may incorporate, but is in no way limited to, activated carbon in a granulated, a powdered, a solid block, a cartridge, or another form and may need to be either replaced or reactivated periodically to ensure that the activated carbon retains adsorptive filtering properties sufficient to adsorb emulsified support material.

The cleaning system illustrated in FIG. 3 may also include a secondary solution reservoir (329) configured to enable fluid level adjustments in the ultrasonic tank (302) when SFF articles of various volumes or in varying numbers are added to or removed from the cleaning system. The secondary solution reservoir (329) may also be used to contain the entire volume of hot water solution (300) present in the system when it is desired for the ultrasonic tank (302) to serve as a dry oven or otherwise be without the hot water solution present. The secondary solution reservoir (329) may include additional hot water solution (300) housed in an appropriate container (330), and may further include a pump (332), a solution line (334) to physically couple the secondary solution reservoir (329) to the hot water bath, and a valve (336) to open and close the solution line (334). Additionally, an automated control system such as a float or sensors and actuators may be incorporated to operate the valve (336) and the pump (332) thereby allowing regulation of solution levels in the ultrasonic tank (302) and the secondary solution reservoir (329). By opening the valve (336) and activating the pump (332), hot water solution may be drawn through the solution line (334) from the secondary solution reservoir (329), through the filter (344), and into the ultrasonic tank (302) in order to increase the level of hot water solution in the ultrasonic tank (302). Once either an automated control system or a manual method has determined that a reasonable hot water solution level has been reached in the ultrasonic tank (302), the pump (332) may be deactivated and the valve (336) may be closed simultaneously to maintain current hot water solution levels. Alternatively, the valve (336) may be opened and the pump (332) may be activated in the opposite direction, which may draw hot water solution through the solution line (334) from the ultrasonic tank (302) to the secondary solution reservoir (329) in order to reduce the amount of hot water solution in the ultrasonic tank (302).

The cleaning system illustrated in FIG. 3 may also include robotic arms, conveyor belts, or other means (not shown) configured to move, rotate, vibrate, or otherwise manipulate the SFF article (310) thereby further automating or enhancing the effectiveness of the cleaning process. The automating means may be used to place the SFF article in the dry ultrasonic tank oven, to submerge the SFF article (310), in the bath, to subsequently remove it, to remove bubbles from the surface of the article (310) to induce full wetting prior to the activation of the ultrasonics (304), or to otherwise enhance the cleaning process.

Figure 4A:
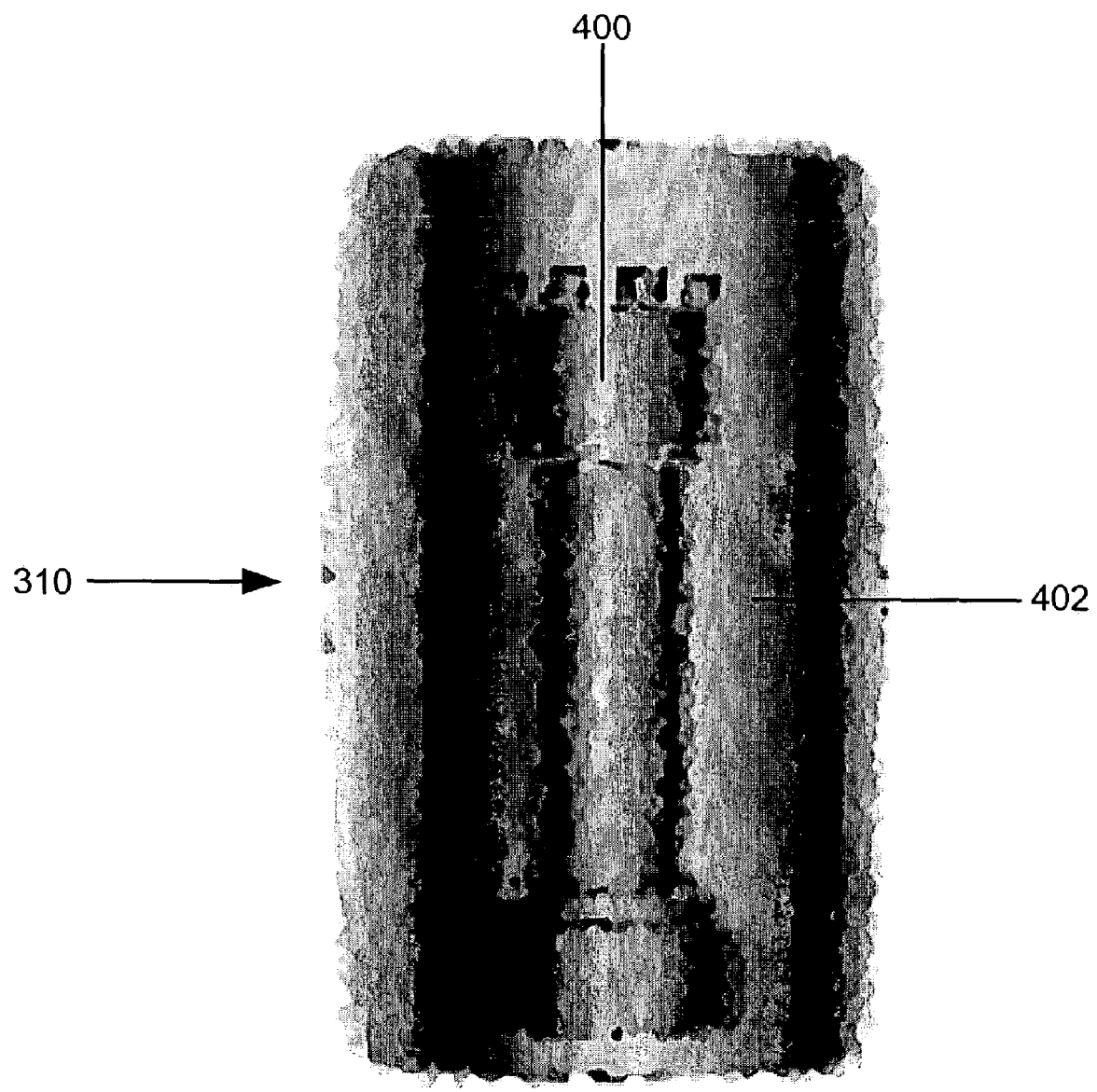
FIG. 4a is a side view of an example SFF article after fabrication, including both build and support material, before being subjected to a cleaning procedure according to one exemplary embodiment.

FIGS. 4a-8 depict the SFF example article (310) during various stages of the cleaning process illustrated in FIG. 9. As FIGS. 4a-8 will be more easily appreciated after consideration of FIG. 9, a brief explanation of FIG. 9 will be given here with a more detailed explanation given hereafter with reference to FIGS. 4a-8. The process illustrated in FIG. 9 begins by first determining whether or not the activated carbon or other filtering media in the filter (344; FIG. 3) is fresh (step 900); if it is fresh (Yes, step 900), the SFF article (310; FIG. 4a) or articles to be cleaned may be placed inside the ultrasonic tank (302; FIG. 3) serving as a heated environment for melting support material (step 910). The hot water solution level in the ultrasonic tank (302; FIG. 3) may be raised or lowered in order to accommodate SFF articles of different volumes (step 920) or numbers. A substantial majority of the support material (402; FIG. 4a) may then be melted from the SFF article (310; FIG. 3) or articles in the heated environment. Once melted, the support material rises to the surface of the hot water solution (300; FIG. 3) due to buoyant forces where it may be skimmed off (step 930). The ultrasonics (304; FIG. 3) may then be activated to remove a remaining support material residue (step 940), which may consequently produce an emulsion of support material (402) in the hot water bath. At various intervals or throughout the entire cleaning process, an activated carbon filter (344; FIG. 3) or other filtering means may be employed to capture and remove emulsified or otherwise present support material (402; FIG. 4a) thereby prolonging the useable life of the solution (step 950). Subsequent to the ultrasonic scrubbing process (step 940), the SFF article (310; FIG. 4a) or articles, now substantially composed of build material (400; FIG. 4a), may be removed from the cleaning system (step 960). After removal of a completed article, a decision may be made as to whether or not another SFF article (310; FIG. 4a) is to be cleaned. If it is determined that another SFF article (310; FIG. 4a) is to be cleaned (Yes, step 970), the process repeats from step 900. If not (No, step 970), the process is complete. Moreover, if at any time the activated carbon should be found to have lost its adsorptive properties during a carbon check (No, step 900), the activated carbon may be replaced or reactivated (step 980).

Figure 4B:
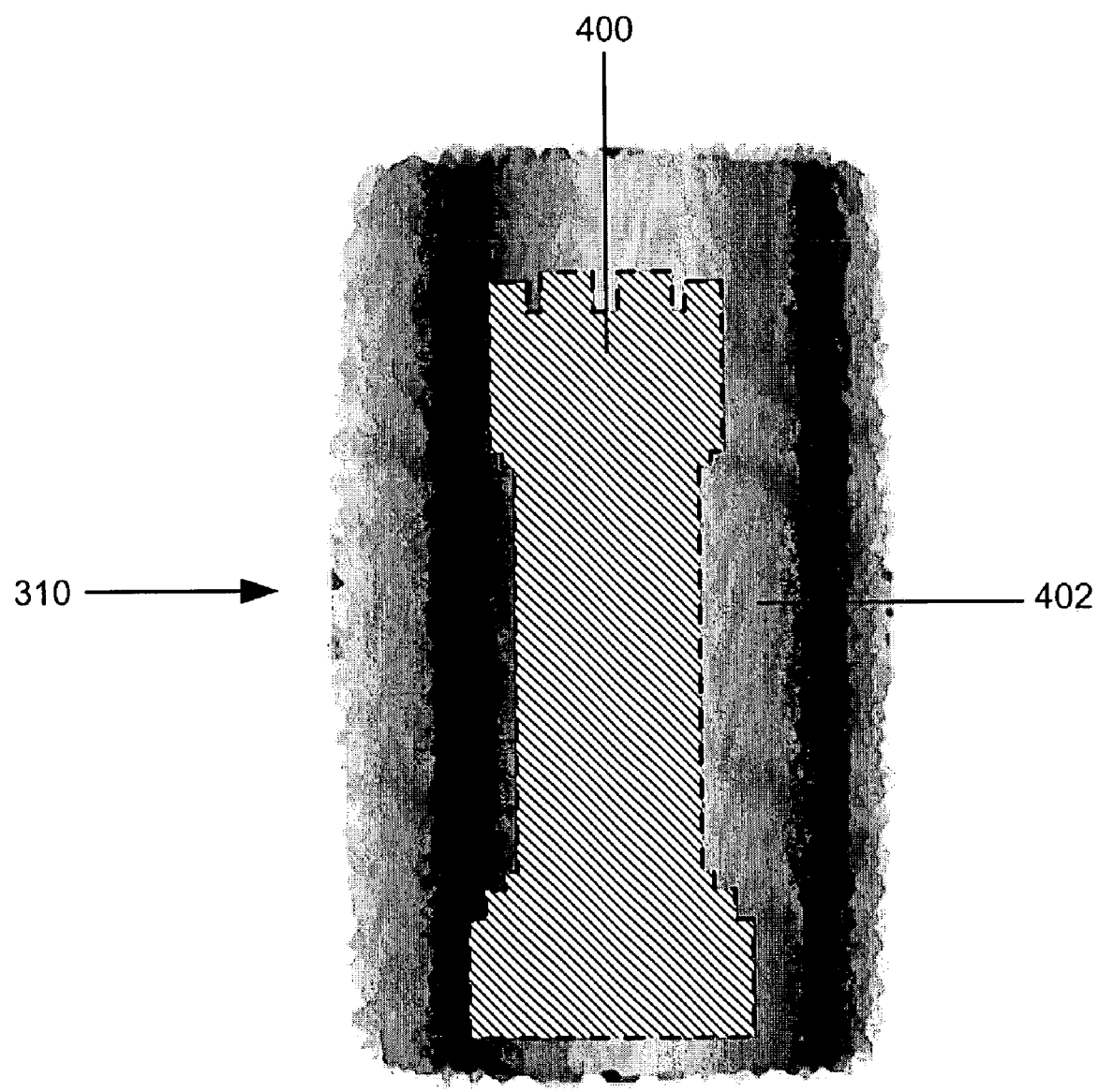
FIG. 4b is a cross sectional view of an example SFF article according to one exemplary embodiment.

As shown in FIG. 9, the process may begin with a check of the activated carbon (step 900). If the efficacy of the activated carbon in the filter (344; FIG. 3) is determined to have retained its adsorptive properties (Yes, step 900), an SFF object (310; FIG. 4b) or objects may be placed in the hot water solution (300; FIG. 3) contained by the ultrasonic tank (step 910). The hot water solution level in the ultrasonic tank (302; FIG. 3) may be raised or lowered as needed (step 920) with use of the secondary solution reservoir (329; FIG. 3), attendant pump (332; FIG. 3), and valve (336; FIG. 3). The determination of a present and desired hot water solution level inside the ultrasonic tank (302; FIG. 3), and control of the valve (336; FIG. 3) and pump (332; FIG. 3) may be performed by an automated system of sensors and actuators or by manual means such as the selective placement of the overflow weir (338).

FIG. 4a illustrates an example SFF article (310) after a fabrication process has been performed and the object (310) has been placed inside the hot water bath of the cleaning apparatus in FIG. 3. The article (310) may include both build material (400) making up the desired SFF object and support material (402) that is to be removed. The build material (400) may be interior to, and/or surrounded by, the support material (402) in accordance with the operating principles of the SFF system (100; FIG. 1) previously described. Similarly, in the case of an SFF article (310) with a horizontal through-hole or other cavity, support material (402) may be substantially surrounded (locally) by build material (400).

FIG. 4b similarly shows a cross-sectional view of the example SFF article (310). In FIG. 4b, a portion of the support material (402) has been stripped away to illustrate the build material (400) interior to it.

Once the SFF object has been placed in the ultrasonic tank (302; FIG. 3), the temperature of the hot water solution (300; FIG. 3) may be raised (or has already been raised) to a convenient temperature between the melting points of the build (400) and support (402) materials. Under these conditions the support material (402) may melt (step 930; FIG. 9) since its melting point is below the current temperature of the hot water solution (300; FIG. 3). Melted support material may then float to the surface of the hot water solution (300; FIG. 3) due to its buoyancy in the hot water solution.

Figure 5:
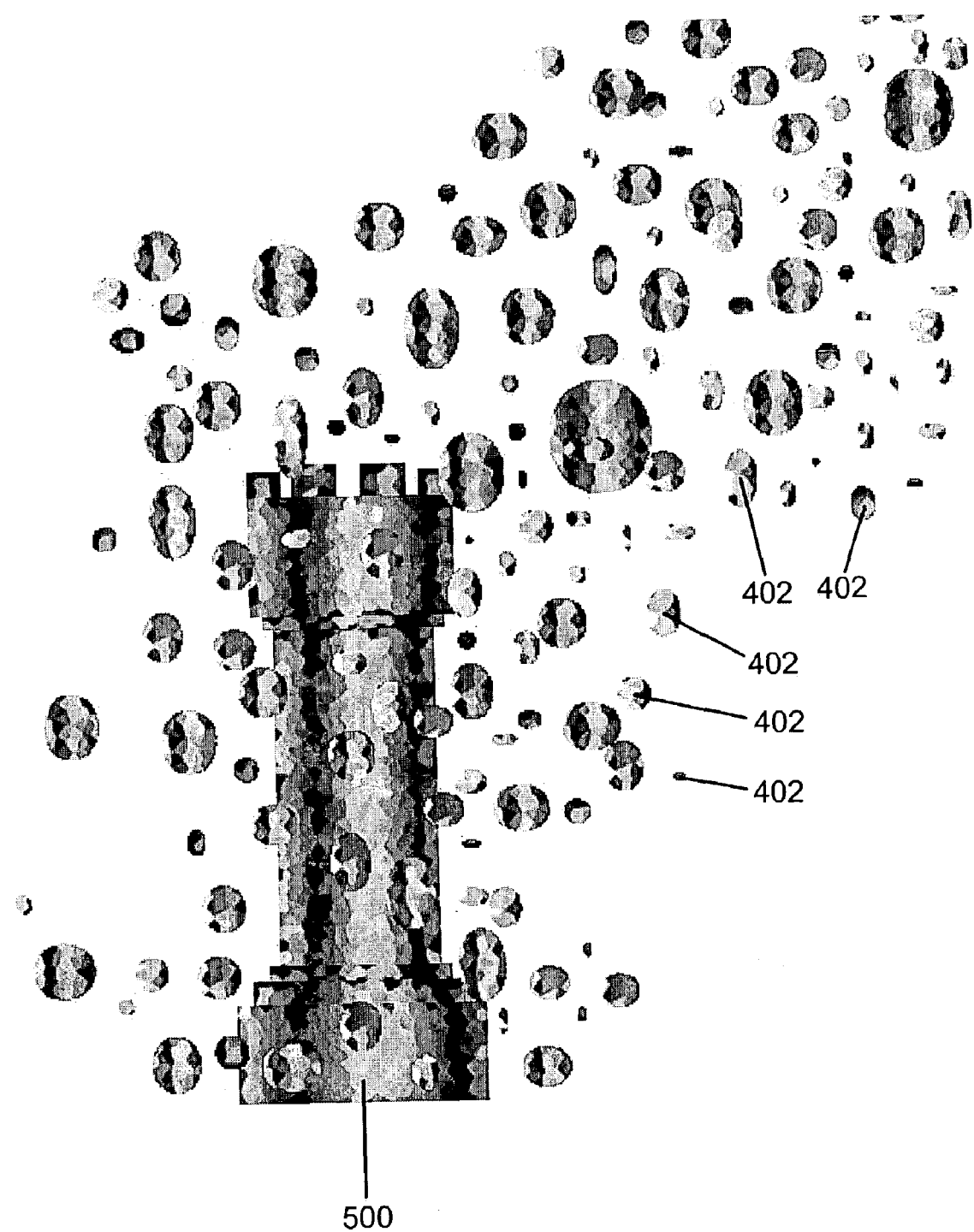
FIG. 5 illustrates an SFF article with a majority of the support material melting off the SFF article according to one exemplary embodiment.

FIG. 5 depicts the SFF article (310; FIG. 4b) with a substantial majority of the support material (402) floating to the surface of the hot water solution (300; FIG. 3) due to its buoyancy in that medium. The illustrated flotation may occur after a substantial majority of support material has been melted in a hot water bath. After melting a substantial majority of the support material (402), the build material (400; FIG. 4b) may remain coated with a waxy residue (500) of support material.

As is mentioned above, the meltable support material may float to the surface of the hot water solution (300; FIG. 3) due to its buoyancy in that medium. Once on the surface of the hot water solution (300; FIG. 3), the floating support material may be removed by a skimming device. As shown in FIG. 3, a belt skimmer apparatus (312) may provide for removal of the support material (402; FIG. 4b) by skimming it from the surface of hot water solution (300) collected in the reservoir tank (326). The SFF article may be left to be processed in the hot water bath until a substantial majority of the meltable support material (402; FIG. 4b) has melted off and has been removed from the surface of the hot water bath by skimming (step 930; FIG. 9).

Figure 6:
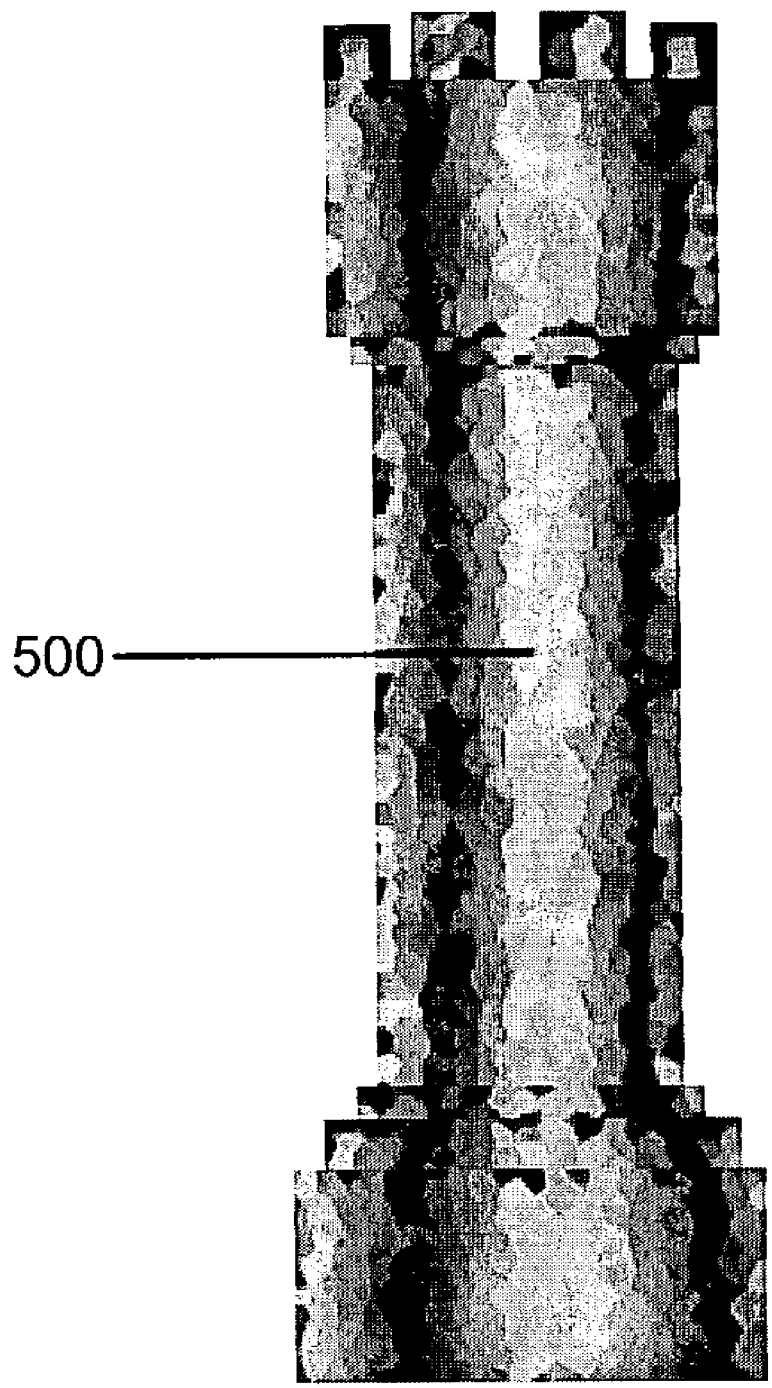
FIG. 6 is a representation of an SFF article before an ultrasonic cleaning process according to one exemplary embodiment.

FIG. 6 shows the SFF object (310; FIG. 4b) after a substantial majority of the support material (402; FIG. 4b) has melted away and has been skimmed off the surface of the hot water solution (300; FIG. 3) but before ultrasonics (304; FIG. 3) have been activated. A support material residue (500) may adhere to the surface of the build material (400; FIG. 4b) despite operating the present system at a solution temperature greater than the melting point of the support material (402; FIG. 4b) due to surface adhesion forces, especially in corners and around small features. Around overhangs or other sharp build material transitions this adhesion effect may be multiplied due to adhesion between support material (402; FIG. 4b) particles themselves and increased build material surface areas, resulting in a thicker support material residue (500) in these areas. The support material residue (500) may also be particularly thick under build material overhangs since support material removal in this system is primarily due to buoyant forces on melted support material being greater than adhesion forces between support material particles and other support material or build material particles; overhangs may prevent buoyant forces from carrying the support material away from the SFF object (300; FIG. 3).

In order to remove the support material residue (500; FIG. 5), an ultrasonic transducer or transducers (304; FIG. 3) may be activated (step 940; FIG. 9) at one or more frequencies in the hot water solution (300; FIG. 3). These ultrasonics induce cavitation in the hot water solution and on the surface of the SFF build material (400; FIG. 4b) thereby removing the remaining support material (402; FIG. 4b) from the build material (400; FIG. 4b). Various methods, such as agitation, rotation, or directed flow may also be employed to maximize the removal of support material from SFF object geometries.

Figure 7:
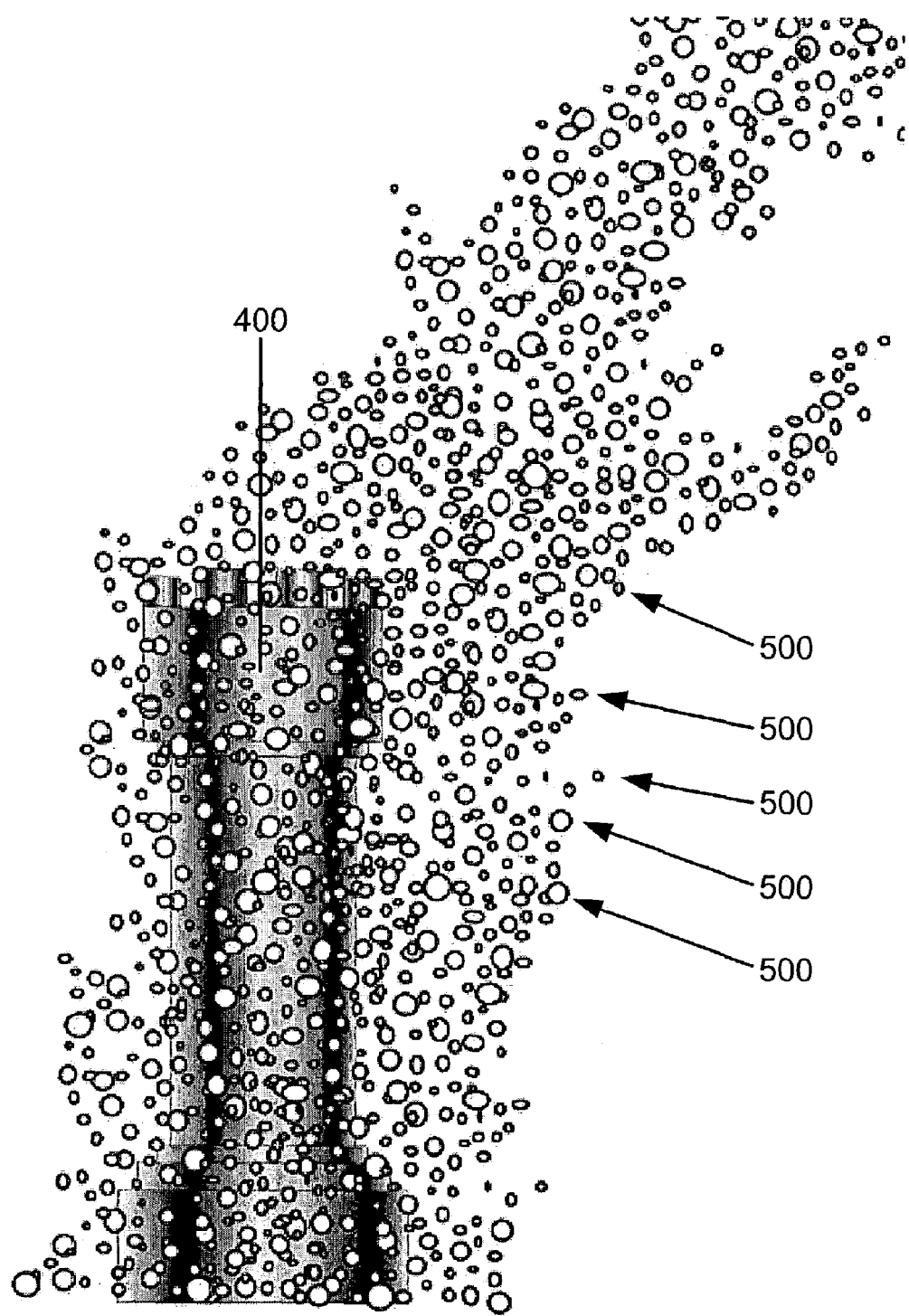
FIG. 7 is a drawing of the SFF article undergoing an ultrasonic cleaning process according to one exemplary embodiment.

FIG. 7 illustrates an ultrasonic cavitation process removing the support material residue (500) from the SFF article (310; FIG. 4b). As shown in FIG. 7, once the ultrasonics (304; FIG. 3) have been activated the particles forming the waxy residue (500) may be dislodged from the surface of the build material (400; FIG. 4b) by cavitations, forming an emulsion in the hot water solution (300; FIG. 3). Cavitation is the formation and subsequent implosion of bubbles, wherein the violence of the implosion may exhibit sufficient power to overcome particle to substrate adhesion forces and dislodge impurities from the surface of an object. Some of the particles dislodged from the SFF article during cavitation may range from 50 microns in diameter to less than 50 nanometers in diameter and may remain in the hot water solution near the SFF article. Concentrations may increase to greater than $10^7$ particles per cubic centimeter of hot water and, if left in the solution, the particles would soon reduce the cleaning effectiveness of the solution on the current or subsequent SFF articles. Because removal of material particles of this size and quantity may require special equipment and considerations, traditional cleaning systems often require a fresh water source and an industrial water drain to enable replacement of ineffective wash solution.

In order to prevent a decrease in the effectiveness of the solution, the activated carbon filter pump (348) or other filtering device may draw hot water solution (300; FIG. 3) containing dislodged support material (402; FIG. 5) into the solution intake (346; FIG. 3) of the activated carbon filter (344; FIG. 3). The pump may draw the emulsified support material residue (500) particles over activated carbon in the filter (344; FIG. 3) where they may be adsorbed by the activated carbon. The filtered solution may then be returned to the bath via the solution return duct (347). By filtering out the support material particles, the effective life of the solution may be prolonged. As described above, the support material (402; FIG. 4b), in this case the waxy residue (500) particles, may be extraordinarily small and are shown in FIG. 7 for illustrative purposes only.

The activated carbon used in the activated carbon filter (344; FIG. 3) is a micro-porous form of carbon possessing tremendous internal surface area for its volume and weight. Carbon atoms near the surface of the activated carbon may experience random quantum fluctuations giving rise to small ranged electrostatic forces (van der walls forces), which may in turn exert an attractive force on molecules in the surrounding solution. In particular, large organic molecules and other long polymer molecules may be attracted to the activated carbon's surface, and may subsequently become fixed to the activated carbon's surface. This process of molecules' attraction and fixation to the surface of activated carbon is called adsorption. Due to activated carbon's unusually high internal surface area it may be used as an effective filter substrate, adsorbing great amounts of contaminants before becoming ineffective. Once activated carbon has become saturated with impurities, it may be reactivated or replaced with fresh activated carbon in order to allow a filter to continue to perform filtering functions. As applied to the present system, when the solution containing waxy residue particles is drawn over the activated carbon filter (344; FIG. 3) the waxy residue particles are removed from the solution enhancing the solution's useful life.

Figure 8:
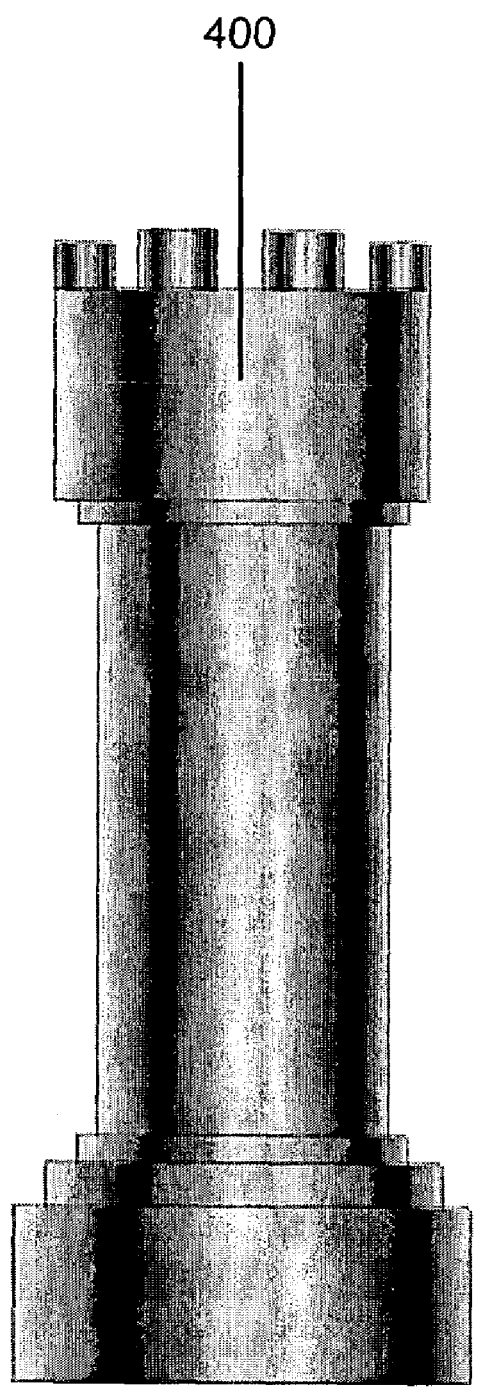
FIG. 8 is a representation of the SFF article after completion of the cleaning process in the apparatus of FIG. 3 according to one exemplary embodiment.

FIG. 8 shows the SFF article (310; FIG. 4b) after the cavitation process has been performed. As shown in FIG. 8, the cavitation process may remove substantially the entire support material residue on the SFF article (310; FIG. 4b). After the cavitation process the SFF article is comprised substantially of build material (400; FIG. 4b) and is ready for removal from the cleaning system shown in FIG. 3.

Returning again to FIG. 9, with the cleaned SFF object (310; FIG. 4b) being made up essentially of build material (400; FIG. 4b), the desired SFF object may be removed from the cleaning system (step 960). Again a decision is made, either by an operator or by automatic means, to determine whether another SFF article should be cleaned (step 970). If there is another article to be cleaned (Yes, step 970), the activated carbon may again be checked for effectiveness (step 900) and the process may be repeated. If, however, there are no more SFF objects to be cleaned (No, step 970), the process may be terminated. If at any time during an activated carbon check (step 900) the activated carbon (300; FIG. 3) or any other filter media is found to be exhausted of its adsorption properties (No, step 900), the activated carbon may be reactivated or disposed of and new activated carbon or filter media may be added to the system (step 980). While FIG. 9 illustrates the filter media performance check (step 900) being performed after a complete cleaning cycle, the filter media check (step 900) may be performed at any time during the cleaning sequence. Depending on the skimming technique employed, a skimmer's collection cup or other filter media or collection device may also need to be removed periodically and emptied, washed, or replaced.

The ultrasonic scrubbing process explained above possesses the advantage of having the ability to remove support material residue from all surfaces of the SFF article including tiny crevices and other places that manual methods are unable to clean. As water cavitates most effectively in the range from 50 degrees to 60 degrees C., it may be advantageous to include an automatic controller or other means to allow the user to raise or lower the temperature of the hot water bath by a few degrees to place the temperature in this effective range while the ultrasonics are turned on. Cavitation may also be tuned using power inputs and performing frequency selection, which may increase cavitation effectiveness. As lower frequency cavitation may produce larger bubbles, cavitation driven at lower frequencies may have greater ability to remove larger particles and particles which are more securely attached to an object's surface. Higher frequency cavitation may conversely produce smaller bubbles, and may be better suited to removing support material particles from smaller features, cavities, and severe surface transitions. Consequently, cavitation may be performed at alternating frequencies or simultaneously at multiple frequencies in order to provide the combined benefits of efficient, large scale support material removal while also removing support material minutiae from small features.

Moreover, the present method and system for cleaning SFF parts with meltable support materials requires very little human assistance as described, and is benefited by the possibility of being practiced in a fully automated form. The secondary solution reservoir (330; FIG. 3) and attendant pump (332; FIG. 3) and valve (336; FIG. 3) may make possible solution level changes in the ultrasonic tank (302; FIG. 3) to accommodate cleaning different numbers of articles simultaneously and/or articles of different volumes. A computing device may also be used in conjunction with the system in order to aid in or entirely regulate a decision making process associated with the support material removal process. The computing device may also govern the previously discussed robotic arms, conveyer belts, or other means to move, rotate, vibrate, or otherwise manipulate the SFF article; solution levels in the ultrasonic tank (302) and secondary solution reservoir (330; FIG. 3); fluid temperatures, flow rates; activation of the skimmer; etc. The cleaning system and method may well be incorporated into the SFF system (100; FIG. 1) itself, or may be housed separately. Additionally, the system and method may be closed-loop and self contained requiring neither drains nor other types of cumbersome water hookups or outlets, and therefore may be well suited to be used in non-industrial environments such as the office or classroom.

Alternative Embodiment

The system and method previously described need not be limited to removing support materials from SFF articles. In an alternative embodiment, the system and method taught herein may be used to remove support material from objects produced by methods other than solid freeform fabrication. In one exemplary embodiment, the system and method described above are used in the production of optical lenses to remove support material from lens materials after grinding.

Lenses for glasses, binoculars, telescopes, and other optical devices are traditionally made by taking a lens blank made of glass, polycarbonate, dietheylene glycol bisallyl carbonate (CR-39), or another optical material and "blocking" the lens blank (attaching it to a metal block using a mixture of paraffin waxes as a meltable support material). The lens blank is then cut, ground, and polished to predetermined dimensions appropriate to its application by machinery that uses the metal block to handle and position the lens relative to grinding tools. When the cutting, grinding, and polishing processes are complete the lens blank is called a lens and the metal block and wax adhesive must be removed from the lens. Removal of the metal block and wax adhesive may be automated by introducing the lens, metal block, and wax into the present system and subjecting the same to the method taught herein.

The preceding description has been presented only to illustrate and describe embodiments of the present system and method. It is not intended to be exhaustive or to limit the invention to any precise form disclosed. Many modifications and variations are possible in light of the above teaching. It is intended that the scope of the invention be defined by the following claims.

What is claimed is:

1. A closed loop system for separating materials of differing melting points comprising:
    an ultrasonic bath including a solution configured to supply thermal energy and cavitation to said materials of differing melting points, wherein said thermal energy has a temperature between said differing melting points; and
    a solution reservoir configured to adjust levels of said solution in said ultrasonic bath.

2. The closed loop system of claim 1, further comprising a filter configured to remove particles from said solution.

3. The closed loop system of claim 1, further comprising a skimmer configured to remove buoyant particles from said ultrasonic bath.

4. The closed loop system of claim 3, wherein said skimmer comprises one of a belt, a disk, a drum, a mop, a tube, a floating suction, a columnar, a co-current, a counter current, or a venturi technology skimmer.

5. The closed loop system of claim 1, wherein said ultrasonic bath comprises:
    a hot solvent bath; and
    an ultrasonic transducer.

6. The closed loop system of claim 5, wherein said solvent comprises water.

7. The closed loop system of claim 1, wherein said ultrasonic bath comprises:
    a dry oven; and
    a solvent bath including an ultrasonic transducer.

8. The closed loop system of claim 1, wherein said materials are formed, respectively, into an solid free form fabrication object and support structure for said object, said ultrasonic bath being configured to remove said support structure from said object using said thermal energy and cavitation.

9. The closed loop system of claim 8, further comprising a computing device configured to control removal of said support structure material from said object using said system.

10. The closed loop system of claim 9, further comprising a conveyor belt or a robotic arm configured to manipulate said object while in said system.

11. The closed loop system of claim 10, wherein said system comprises an automated system.

12. A production system comprising a closed loop system for removing support material from a fabricated article, wherein said system for removing support material receives said article after fabrication by a solid freeform fabrication system, said production system comprising:
    a jetting head for selectively depositing two different materials, a build material for forming said article and a support material for supporting formation of said article, wherein said materials have different melting points; and
    an ultrasonic bath configured to supply thermal energy and cavitation to said article to separate any remaining support material from said article, wherein said thermal energy has a temperature above a melting point of said support material but below a melting point of said build material.

13. The closed loop system of claim 2, wherein said filter comprises one of an activated carbon, an oil absorber, or a sand filter.

14. The closed loop system of claim 1, further comprising a UV radiation applicator configured to remove particles of said materials of differing melting points from said solution.

15. The system of claim 8, wherein said ultrasonic bath comprises at least one ultrasonic transducer that operates at different frequencies, a first frequency being effective to remove at least some support structure material from said object and a second frequency being effective to remove smaller portions of support structure material from said object.

16. The system of claim 15, wherein said ultrasonic transducer outputs ultrasonic energy at said first and second frequencies simultaneously.

17. The system of claim 15, wherein said ultrasonic transducer alternately operates at said first and second frequencies.

18. The system of claim 1, wherein said materials comprise a lens and support material used during formation of said lens.

* * * * *

UNITED STATES PATENT AND TRADEMARK OFFICE
CERTIFICATE OF CORRECTION

PATENT NO. : 7,833,005 B2
APPLICATION NO. : 10/637271
DATED : November 16, 2010
INVENTOR(S) : Shawn D Hunter et al.

Page 1 of 1

It is certified that error appears in the above-identified patent and that said Letters Patent is hereby corrected as shown below:

In column 12, line 2, in Claim 8, delete "an" and insert -- a --, therefor.

Signed and Sealed this
Fifth Day of April, 2011

David J. Kappos
*Director of the United States Patent and Trademark Office*